United States Patent [19]

Scheer

[11] 4,431,097
[45] Feb. 14, 1984

[54] MULTIPLE DISK CLUTCH WITH FORCED LIFT AND SIMPLIFIED ASSEMBLY

[75] Inventor: Erich Scheer, Escherndorf, Fed. Rep. of Germany

[73] Assignee: Fichtel & Sachs AG, Schweinfurt, Fed. Rep. of Germany

[21] Appl. No.: 314,742

[22] Filed: Oct. 23, 1981

[30] Foreign Application Priority Data

Nov. 3, 1980 [DE] Fed. Rep. of Germany ....... 3041342

[51] Int. Cl.$^3$ ...................... F16D 13/56; F16D 13/75; F16D 13/68
[52] U.S. Cl. .............................. 192/70.18; 192/70.25; 192/70.28; 192/107 C
[58] Field of Search ............... 192/70.18, 70.25, 70.28, 192/107 C, 111 A

[56] References Cited

U.S. PATENT DOCUMENTS 4,257,502 3/1981 Riese .................................. 192/70.25
4,339,023 7/1982 Maycock ......................... 192/111 A

FOREIGN PATENT DOCUMENTS 1284718 12/1968 Fed. Rep. of Germany ... 192/111 A
1373753 11/1974 United Kingdom .
1476304 6/1977 United Kingdom ............. 192/70.18

Primary Examiner—Allan D. Herrmann
Attorney, Agent, or Firm—Toren, McGeady and Stanger

[57] ABSTRACT

In a multiple disk clutch, a first clutch disk is located between a flywheel which forms a counter-pressure plate and an intermediate plate and a second clutch disk is located between the intermediate plate, on the opposite side from the first clutch disk, and a pressure-plate. The two clutch disks are attached to an output shaft so that they rotate with but are axially slidable relative to the shaft. The intermediate plate has balance edges each supporting a two-arm lever approximately at its center. The two-arm levers are disposed in planes approximately parallel to the clutch disks and they are arranged to pivot on the intermediate plate about an axis extending radially of the axis of rotation of the clutch. One arm of each lever is connected by a swivel joint to the clutch housing and the other arm is connected by a swivel joint to the pressure plate. A lifting spring prestresses the intermediate plate toward the pressure plate.

8 Claims, 7 Drawing Figures

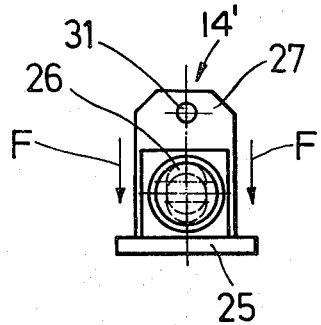
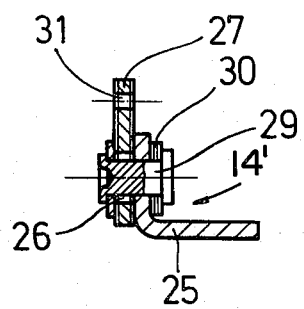
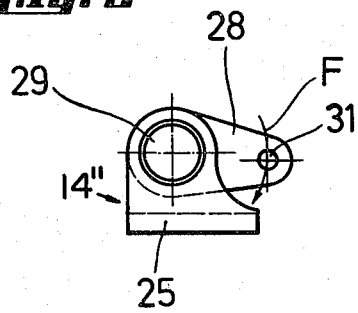
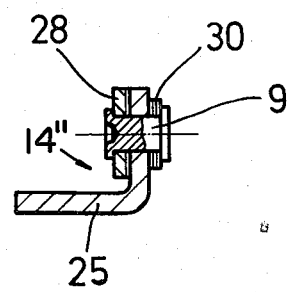
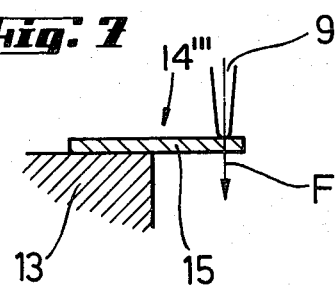

MULTIPLE DISK CLUTCH WITH FORCED LIFT AND SIMPLIFIED ASSEMBLY

SUMMARY OF THE INVENTION

The present invention is directed to a multiple disk clutch, particularly a double disk clutch made up of a flywheel forming a counter-pressure plate, a first clutch disk located between the flywheel and an intermediate plate with a second clutch disk on the opposite side of the intermediate plate followed by a spring-loaded pressure plate. The clutch disks are secured on an output shaft so that they rotate with but are axially slidable relative to the shaft. The clutch includes one or several two-arm levers each disposed in a plane parallel to the clutch disks. These levers are supported on the intermediate plate and pivot about an axis of rotation radial to the axis of rotation of the clutch. One arm of the levers is connected to the flywheel or to the clutch housing while the other arm is connected to the pressure plate.

Such a double disk clutch is disclosed in U.S. Pat. No. 4,257,502. In this known clutch, several two-armed levers are pivotally arranged at the periphery of the intermediate disk with the arms of the levers connected to the pressure plate and the housing to afford a forced lift of the intermediate disk which is approximately half as great as the lift of the pressure plate. To compensate for wear of the lining on the disks, the centers of rotation of the two-armed levers are slidably arranged relative to the intermediate plate against the force of a friction device.

Based on the known state of the art, it is the primary object of the present invention to provie a double disk clutch which permits the uniform gripping of both clutch disks during the starting process, guaranteeing the satisfactory lifting procedure for the pressure plate and intermediate plate, as well as a simple assembly of the individual clutch parts.

In accordance with the present invention, a first pivotal joint connects each lever to the clutch housing and a second pivotal joint connects the lever to the pressure plate. A lifting spring stresses the intermediate plate toward the pressure plate. A cutting or balance edge located on the intermediate plate supports the two-armed levers approximately between their two swivel or pivotal joints. By the arrangement of the two-armed levers between the pressure plate and the housing, with the intermediate plate stressed in the direction toward the pressure plate and in contact via its balance or cutting edges against the levers, the assembly and disassembly of the clutch is considerably facilitated. Accordingly, it is possible to remove the pressure plate and the housing or at least a part of the housing along with the two-armed levers without being concerned with the other clutch parts still attached at the flywheel. After the pressure plate is removed, it is possible to remove the gear side clutch disk and then the intermediate plate and the motor side clutch disk.

To afford automatic wear compensation, each of the levers has a readjusting device located between the swivel joint and the housing. This feature ensures that, during assembly of the double disk clutch, after repair, as well as at the original assembly, wear compensation takes place automatically along with automatic contact of the cutting or balance edge supports on the intermediate plate with the levers.

It is possible to construct the readjusting device as a shifting or rotating device dependent on a frictional force or, instead, to provide a plastically deformable structural part which affords the simplest solution. This is possible because, during operation, the readjusting device is always stressed and moved in one direction.

It is advantageous if only the second clutch disk is provided with a spring suspension for the friction lining or, if both clutch disks are provided with a spring suspension, then to equip the spring suspension of the second clutch disk with a greater slope of the spring characteristic relative to the spring suspension of the first clutch disk. In this way, it is possible, during clutching and regular operation, to ensure that the balance edge of the intermediate plate always rests securely against the appropriate lever. At the same time, the readjusting or shifting device is prevented from any accidental movement by reaction forces during the clutching operation.

Although from experience it has been noted that the wear of the lining of the gear side clutch disk is greater than the wear on the lining of the motor side clutch disk, it may, in certain instances, be advantageous to provide the gear side clutch disk with a lining material which is subject to greater wear. Accordingly, it can be assured that the cutting or balance edge support between the intermediate plate and the levers is always in contact during the engaged state of the double disk clutch.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is an elevational view of a readjusting device having linear shifting movement;

FIG. 4 is a sectional view through the readjusting device in FIG. 3;

FIG. 5 is an elevational view of another readjusting device with rotary shifting motion;

FIG. 6 is a sectional view through the readjusting device in FIG. 5; and

FIG. 7 illustrates a readjusting device incorporating plastic reformation.

DETAIL DESCRIPTION OF THE INVENTION

Figure 1:
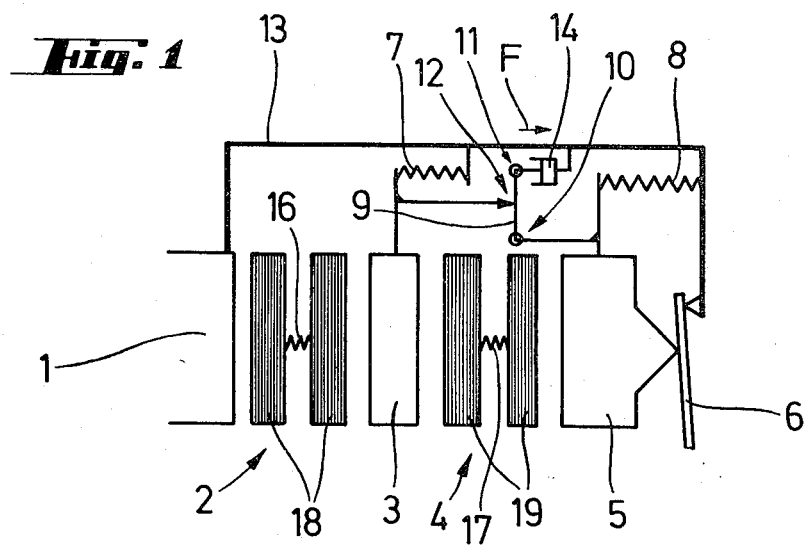
FIG. 1 is a diagrammatic representation of a double disk clutch embodying the present invention.
Figure 2:
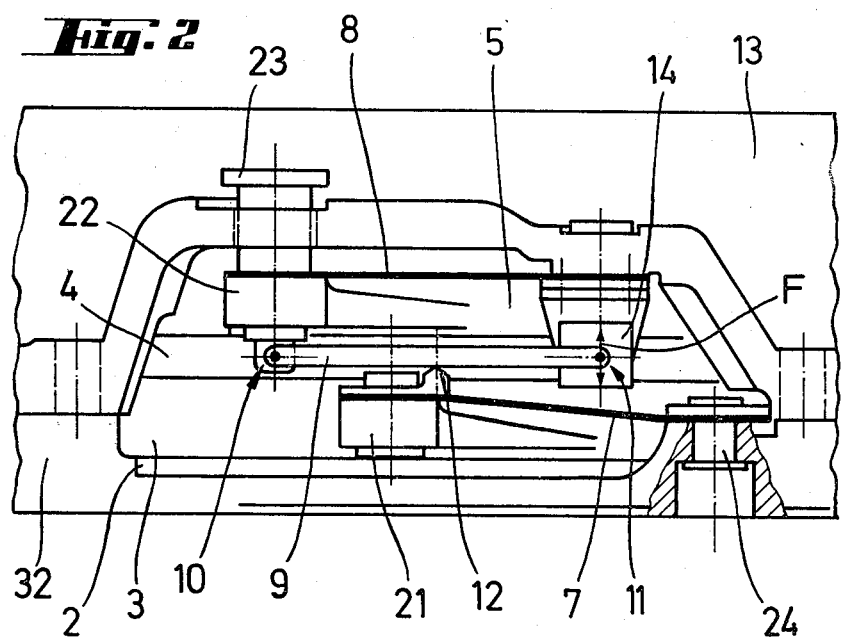
FIG. 2 is a view taken radially outwardly from the double disk clutch in FIG. 1.

In the drawing, FIG. 1 provides a diagrammatic representation of a double disk clutch, while FIG. 2 provides a side view of the same clutch. The double disk clutch includes a flywheel 1 detachably connected to a housing 13. Within the housing a first clutch disk 2 adjoins the flywheel 1 and can also be designated as the motor side clutch disk. As can be seen more clearly in FIG. 1, the next clutch component is an intermediate plate 3 followed by a second clutch disk 4 or the gear side clutch disk with a pressure plate 5 on the opposite side of the disk 4 from the intermediate plate 3. The clutch disks 2, 4 are secured for rotation on an output shaft, not shown, however, they are axially slidable along the shaft. Intermediate plate 3 and pressure plate 5 are fixed to the housing 13 so that they rotate with it, however, they also are axially slidable. Each of the intermediate plate and pressure plate is connected to the housing by tangential leaf springs 7, 8 with the spring 7 also providing a lifting force on the intermediate plate 3 for biasing the intermediate plate toward the pressure plate 5. Tangential leaf spring 8 for the pressure plate 5 provides a force which ensures that the pressure plate always contacts the diaphragm spring 6. In turn, diaphragm spring 6 generates a clamping force for the two clutch disks as well as transferring the lifting movement to the pressure plate 5. While the drawing shows only one tangential leaf spring, several of such springs are distributed about the periphery of the intermediate plate 3 and the pressure plate 5. In the illustrated arrangement, as shown in FIG. 2, the tangential leaf springs 7 are attached directly to an intermediate housing 32, while the tangential leaf springs 8 are connected to the housing 13. In FIG. 2 a two-armed lever 9 is shown, however, several of these levers are distributed uniformly. Each lever 9 has a swivel joint 10 at a lug 22 on the pressure plate 5 and another swivel joint 11 is connected to a readjusting device 14 which, in turn, is connected to the housing 13. Tangential leaf spring 8 is also connected between the readjusting device 14 and the housing 13. Pressure plate 5 is blocked by a lifting limitation member 23 at the lug 22 in its movement during assembly and disassembly of the clutch for the protection of the tangential leaf springs 8. The tangential leaf springs 7 extending between the lugs 21 of the intermediate plate 3 and the intermediate plate 3 and the intermedite housing 32 are connected to the intermediate housing by fastening rivets 24 and the springs provide an initial stress biasing the intermediate plate toward the pressure plate and maintain permanent contact of the balance edges 12 with the two-armed levers 9 approximately midway between the swivel joints 10, 11. Clutch disk 2 is provided with friction linings 18 and clutch disk 4 is also provided with friction linings 19. Usually the friction linings 18, 19 are provided with a spring suspension 16, 17, respectively, for affording smooth clutch engagement. The readjusting device 14 will be further explained with respect to FIGS. 3-7. The readjusting device 14 located between the swivel joint 11 of the lever 9 and the housing 13 can be automatically readjusted in the direction of the arrow F during operation of the double disk clutch to compensate for wear on the friction linings 18, 19.

Operation of the double disk clutch takes place in the following manner:

In the assembly of the clutch, initially the clutch disk 2 is moved into contact with the flywheel 1 and then the intermediate housing 32 along with intermediate plate 3 is attached to the flywheel 1. The clutch housing is divided into two housing parts 13, 32 for simpler assembly and disassembly of the intermediate plate 3, however, such a division of the housing is not necessary. Next, the clutch disk 4 is placed from the outside on the intermediate plate and then the preassembled unit made up of the housing 13, the pressure plate 5, the diaphragm spring 6, two-armed levers 9, as well as the readjusting device 14, is set in place. The shifting device is brought into a position representing maximum distance from the pressure plate 5. During the placement of the housing 13, levers 9 contact the balance edges 12 of the intermediate plate 3 and during tightening of the connecting screws between the housing 13, the intermediate housing 32 and the flywheel 1, the readjusting device 14 automatically adjusts by a corresponding movement in the direction of the arrow F, so that in the assembled state of the clutch in the engaged position, the balance edges 12 contact the levers 9 without any play.

When the clutch is lifted by activating the diaphragm spring 6, that is, when the diaphragm spring 6 is moved into the position shown in FIG. 1, the pressure plate 5 automatically moves away from the flywheel 1 due to the biasing action of the tangential spring 8. At the same time, the levers 9 pivot at their swivel joints 11 at the shifting devices 14 which are now stationary due to the engagement of the swivel joints 10 by the pressure plate 5. Accordingly, in the region of their contact with the balance edges 12, the levers perform a lifting motion corresponding approximately to half of the lifting motion of the pressure plate 5. Due to the initial stressing force of the tangential leaf springs 7, the balance edges 12 of the intermediate plate remain in permanent contact with the levers 9 so that the intermediate plate 3 effects a lifting motion of half of the lifting motion of the pressure plate 5. As a result, it is ensured that between the pressure plate 5 and the flywheel 1 as well as between the intermediate plate 3 and the pressure plate 5, an equally great lifting movement takes place for the release of the two clutch disks 2, 4.

When the clutch is engaged the various clutch components undergo opposite movements and due to the pivoting movement of the levers 9 about their swivel joints 11, it is ensured that both the clutch disks 2, 4 are engaged simultaneously and smoothly, because the lifting distance between the flywheel 1 and the intermediate plate 3 on one side, and between the intermediate plate 3 and the pressure plate 5 on the other side is reduced simultaneously and uniformly. When the clutch is being engaged, the initial stress of the tangential leaf springs 7 effects a secure contact between the balance edges 12 on the intermediate plate 3 and the central region of the levers 9 to guarantee that the lifting movement of both clutch disks is simultaneously reduced. Practical experience has shown that the wear of the friction linings on the clutch disk 4 on the gear side is usually somewhat greater than that of the friction linings 18 on the clutch disk 2 on the motor side. This feature is advantageous because it is assured that, even when the friction linings are worn, the balance edges 12 remain in contact with the levers 9 and the readjusting device 14 is always automatically adjusted only in the direction of the arrow F. To reinforce this effect, and to use the clutch when, due to special installations, there is the danger that the motor side clutch disk is under greater stress, the friction linings 18 of the clutch disk 2 can be secured in a rigid manner omitting the spring suspension 16 of the friction lining or, if this causes a significant interference with the ease of engagement, then the spring characteristic of the spring suspension 17 of the friction lining 19 can be selected so that it is steeper than the spring characteristic of the suspension 16 of the friction lining 18. In such a case, it is always ensured that the travel of the spring suspension 16 of the friction lining 18 of clutch disk 2 is used up first and then the residual travel of the spring suspension 17 is available to retain the balance edges 12 in contact with the lever 9. As a further measure, the clutch disk 4 can be equipped with friction linings 19 subject to greater wear than the friction linings 18.

In FIGS. 3 and 4 an embodiment of the readjusting device 14' is shown in which a slide member 27 can be moved relative to a fastening angle 25 depending on the frictional force. One end of the fastening angle 25 is attached to the housing 13 and one end of slide member 27 is pivotally connected to lever 9. The fastening angle is bent through 90° so that one part extends perpendicularly to the part securing the angle in position. The bent or free portion extends parallel to the slide member 27. The slide member 27 and the fastening angle 25 are clamped together by a fastening rivet 29 including springs 30 so that the slide member can be shifted only after overcoming a frictional force. An oblong hole 26 is formed in the slide member 27 and permits rectiliner movement of the slide member. The movement is possible in both directions, however, during operation movement only takes place in the direction of the arrow F. Slide member 27 contains a bore 31 serving as a bearing point for the lever 9 and acting as the swivel joint 11.

In FIGS. 5 and 6 another readjusting device 14" is illustrated, however, it provides a rotary or angular movement for the compensation of wear and not a linear movement as in the device of FIGS. 3 and 4. The angular movement is effected between a rotary part 28 and a fastening angle mounted on the rotary part. The mounting arrangement affords a frictional force. When this device is used during operation of the clutch, a rotational or angular movement takes place only in the direction of the arrow F and the frictional force to be overcome depends on the tension of the springs 30 and the lever arm of the distance of the bore 31 from the center of rotation of the rotary part 28.

FIG. 7 is a diagrammatic representation of a readjusting device 14''' in which a plastically deformable part 15 is provided on the housing 13 with a part extending from the housing disposed in contact with one arm of the lever 9. Since the plastically deformable part 15 is firmly connected to the housing 13, it effects readjustment by bending in the direction of the arrow F.

While specific embodiments of the invention have been shown and described in detail to illustrate the application of the inventive principles, it will be understood that the invention may be embodied otherwise without departing from such principles.

I claim:

1. A multiple disk clutch, such as a double disk clutch, comprising a housing, a flywheel acting as a counter-pressure plate, an intermediate plate spaced from said flywheel, a first clutch disk positioned between said flywheel and intermediate plate, a spring-loaded pressure plate spaced from said intermediate plate on the opposite side thereof from said flywheel, a second clutch disk located between said intermediate plate and pressure plate, said first and second clutch disks arranged to be rotatably secured on and axially displaceable along an output shaft, at least one two-armed lever disposed in a plane substantially parallel with said first and second clutch disks, said at least one two-armed lever is pivotally supported on said intermediate plate about an axis of rotation extending radially of the axis of rotation of said clutch disks, one of the arms of said at least one lever is connected to one of said flywheel or said housing and the other arm is connected to said pressure plate, wherein the improvement comprises a first swivel joint connects said at least one lever to said housing and a second swivel joint connects said at least one lever to said pressure plate, a lifting spring biasing said intermediate plate in the direction toward said pressure plate, and said intermediate plate having a balance edge thereon with said balance edge disposed in supporting contact with said at least one lever approximately midway between said first and second swivel joints.

2. A multiple disk clutch, as set forth in claim 1, wherein said lifting spring is a tangential leaf spring.

3. A multiple disk clutch, as set forth in claim 1, wherein a readjusting device is associated with each said at least one two-armed lever for providing automatic wear compensation, said readjusting device is positioned between said first swivel joint and said housing.

4. A multiple disk clutch, as set forth in claim 3, wherein said readjusting device comprises a shifting device incorporating a frictional force to be overcome before the shifting action takes place.

5. A multiple disk clutch, as set forth in claim 3, wherein said readjusting device comprises a plastically deformable part.

6. A multiple disk clutch, as set forth in claim 1, wherein said second clutch disk includes friction lining and a spring suspension for the friction lining.

7. A multiple disk clutch, as set forth in claim 6, wherein said first disk clutch includes a friction lining and a spring suspension for the friction lining, and said spring suspension of said friction lining of said second disk clutch has a greater slope of the spring characteristic than the spring suspension of said first clutch disk.

8. A multiple disk clutch, as set forth in claim 7, wherein said friction linings of said second clutch disk are formed with a lining material more subject to wear than said friction linings of said first clutch disk.

* * * * *